United States Patent [19]

Inukai et al.

[11] Patent Number: 5,192,635
[45] Date of Patent: Mar. 9, 1993

[54] FLUORINE-CONTAINING COPOLYMERS AND CARRIERS FOR DEVELOPING ELECTROSTATIC IMAGES

[75] Inventors: Hiroshi Inukai; Takahiro Kitahara; Kayoko Sugioka; Morio Mizuguchi, all of Settsu, Japan

[73] Assignee: Daikin Industries, Ltd., Japan

[21] Appl. No.: 713,855

[22] Filed: Jun. 12, 1991

[30] Foreign Application Priority Data

Jun. 12, 1990 [JP] Japan ................................ 2-154355

[51] Int. Cl.$^5$ ........................ G03G 9/00; B32B 23/02; B32B 27/02; B32B 27/02
[52] U.S. Cl. ................................ 430/108; 430/904; 428/407
[58] Field of Search ........................ 430/108, 137, 904; 428/407; 427/221

[56] References Cited

U.S. PATENT DOCUMENTS

| | | | |
|---|---|---|---|
| 4,640,966 | 2/1987 | Mitani et al. | 526/249 |
| 4,788,266 | 11/1988 | Koishi et al. | 526/249 |
| 5,064,920 | 11/1991 | Marumoto et al. | 526/249 |

FOREIGN PATENT DOCUMENTS 0362650 4/1990 European Pat. Off. ............ 430/108

*Primary Examiner*—Roland Martin
*Assistant Examiner*—S. Crossan
*Attorney, Agent, or Firm*—Larson and Taylor

[57] ABSTRACT

This invention provides a fluorine-containing copolymer comprising:
(a) 50 to 85 mole % of a structural unit represented by the formula

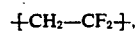

(b) 5 to 40 mole % of a structural unit represented by the formula

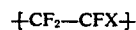

wherein X is H or F, and
(c) 3 to 18 mole % of a structural unit represented by the formula

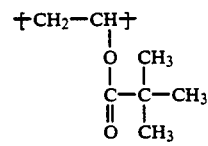

7 Claims, No Drawings

FLUORINE-CONTAINING COPOLYMERS AND CARRIERS FOR DEVELOPING ELECTROSTATIC IMAGES

FIELD OF THE INVENTION

The present invention relates to fluorine-containing copolymers.

The present invention relates also to a carrier for developing electrostatic images which constitute, along with a toner, an electrostatic image developer for use with an electronic photographic copying machine (hereinafter referred to simply as "carrier").

BACKGROUND OF THE INVENTION

Known carriers include those coated with a copolymer comprising vinylidene fluoride (hereinafter generally referred to as "VdF") and tetrafluoroethylene (hereinafter generally referred to as "TFE") (Japanese Unexamined Patent Publication No.58-20,875).

The carrier coated with the VdF/TFE copolymer has excellent properties such as larger electrostatic charge capacity than the silicone-coated carrier and higher electrostatic charge stability due to lower adhesion of the toner to the carrier. However, when the carrier is used in combination with a toner which aims to give improved properties indicated as above to the silicone-coated carrier, the resultant electrostatic image developer exhibits a serious defect that images cannot be transferred because of too large an electrostatic charge capacity. When a toner capable of being used both for the silicone-coated carrier and the VdF/TFE copolymer coated carrier is to be developed without imparing the excellent properties of the carrier as stated above, the toner would be very costly and economically disadvantageous.

Also known are carriers coated with a VdF/TFE/vinyl butyrate copolymer (Japanese Unexamined Patent Publication No.54-110,839). This type of carrier has a moderate and suitable electrostatic charge capacity. However, the coating layer formed of the copolymer is soft and easily damaged when stirred with the particulate toner and low in durability.

SUMMARY OF THE INVENTION

It is the primary object of the present invention to provide a new polymer capable of forming a coating on the carrier core with improved properties.

It is another object of the invention to provide a carrier which can be used even in combination with a toner which is developed for the silicone-coated carrier.

It is a further object of the invention to provide a carrier comprising a core and a coating on the core, the coating having a suitable range of electrostatic charge capacity.

Other objects and features of the invention will become apparent from the following description.

We conducted extensive research to overcome the foregoing problems of the conventional techniques and found that new copolymers comprising 3 comonomers exhibit outstanding properties when used for coating the carrier core.

The present invention provides a fluorine-containing copolymer comprising:
a) 50 to 85 mole % of a structural unit represented by the formula

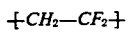

(b) 5 to 40 mole % of a structural unit represented by the formula

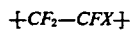

wherein X is H or F, and
(c) 3 to 18 mole % of a structural unit represented by the formula

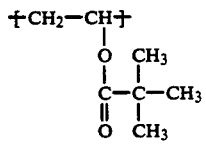

The present invention also provides a carrier for developing electrostatic image, the carrier comprising a core and coating on the core, the coating being formed from a copolymer comprising:
(a) 50 to 85 mole % of a structural unit represented by the formula $$-CH_2-CF_2-$$

(b) 5 to 40 mole % of a structural unit represented by the formula
$$-CF_2-CFX-$$

wherein X is H or F, and
(c) 3 to 18 mole % of a structural unit represented by the formula

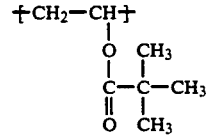

DETAILED DESCRIPTION OF THE INVENTION

The copolymer and the carrier of the invention will be described below in greater detail.

The copolymer useful as coating materials for the carrier core in the invention comprises about 50 to about 85 mole % of the structural unit (a), about 5 to about 40 mole % of the structural unit (b) and about 3 to about 18 mole % of the structural unit (c). The copolymer containing less than 50 mole % or more than 85 mole % of the structural unit (a) results in a low solvent solubility when used as a solution for coating the carrier core. Over 40 mole % of the structural unit (b) used gives a copolymer which shows a low solvent solubility whereas a copolymer is difficult to obtain when the structural unit (b) is less than 5 mole %. When the amount of the structural unit (c) exceeds 15 mole %, a soft copolymer is formed which is low in durability as the coating of the carrier core whereas use of the structural unit (c) in an amount less than 3 mole % gives too high an electrostatic charge capacity to the carrier. A more preferred composition of the copolymer comprises about 55 to about 80 mole % of the structural unit (a), about 15 to about 35 mole % of the structural unit (b) and about 5 to about 15 mole % of the structural unit (c).

The copolymer of the invention may contain a copolymerizable monomer as a third component in addition to the foregoing monomer components or structural units in such an amount that the addition will not impair the properties of the copolymer, for example in an amount of up to about 30% by weight of the copolymer. Examples of such monomers are:

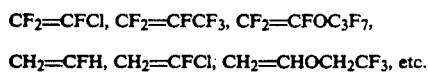

The copolymers of the invention are random copolymers and usually has an intrinsic viscosity ($\eta$) of about 0.2 to about 2.0, preferably about 0.35 to about 1.0, as determined at 35° C. using methyl ethyl ketone (MEK) as a solvent.

The copolymers of the invention are prepared by usual radical polymerization processes such as suspension polymerization employing isobutyryl peroxide, diisopropyl peroxydicarbonate, $(CF_3COO)_2O$ or the like as the initiator and a mixture of water and a chlorofluorohydrocarbon such as 1,1,2-trichloro-1,2,2-trifluoroethane, 1,2-dichloro-1,1,2,2-tetrafluoroethane or the like as the medium; emulsion polymerization employing ammonium persulfate, potassium persulfate, hydrogen peroxide, a redox agent comprising a mixture of at least one of these peroxides, a reducing agent such as ferrous sulfate and a stabilizer such as e-ascorbic acid or the like as the initiator, water as the medium and $C_7F_{15}COONH_4$ or the like as the emulsifies, etc. In the case of suspension polymerization, the weight ratio of water/chlorofluorohydrocarbon is preferably about 3/1 to about ½ and ethyl acetate, acetone or the like may be added for adjusting the polymerization degree. In the case of emulsion polymerization, the amount of emulsifier is preferably about 0.01% based on the weight of water. The polymerization temperature in any polymerization method is usually 0° to 150° C., preferably about 15° to about 80° C. and the polymerization time is up to about 48 hours. The polymerization pressure in any polymerization method is about 2 to about 100 kg/cm², preferably about 5 to about 10 kg/cm².

The coating composition can be prepared by dissolving the copolymer of the invention into an organic solvent. A wide variety of organic solvents can be used which include acetone, methyl ethyl ketone, methyl propyl ketone, methyl isopropyl ketone, methyl isobutyl ketone and like ketone solvents; ethyl acetate, methyl acetate, n-butyl acetate and like acetic acid ester solvents; tetrahydrofuran, dioxane and like cyclic ethers; dimethylformamide, dimethylacetamide and like amides, etc. These solvents can be used singly or as a mixture of at least two kinds. The solvent may contain a diluent medium in an amount up to 50% of the solvent. Examples of diluent media are toluene, xylene and like aromatic hydrocarbons; tetrachloroethylene, trichloroethylene, methylene chloride and like halogenated hydrocarbons; methyl alcohol, ethyl alcohol, butyl alcohol, isopropyl alcohol and like alcohols; 1,1,2-trifluorotrichloroethane, 1,2-difluorotetrachloroethane, hexafluoromethaxylene, 1,1,1,2,2-pentafluorodichloropropane and like fluorine-containing solvents, etc. A preferred solvent has a boiling point of about 60° to about 140° C. in view of the evaporation rate and the like. The coating composition may contain an additive or additives in an amount of up to 30% based on the weight of the copolymer of the invention. Examples of additives are vinylidene fluoride polymer, vinylidene fluoride-tetrafluoroethylene copolymer, silicone, (meth)acrylic polymer, silica, carbon black, electric charge controlling agent, surfactant, lubricant, etc.

The carrier core can be coated by the conventional method or a similar one. More specifically, the surface of the carrier core is coated by the desired conventional method with a solution of the terpolymer of the invention in a solvent.

The materials useful for the formation of the carrier core in the invention are not specifically limited and can be any of conventional materials such as iron, cobalt, nickel, ferrite, magnetite and like ferronmagnetic metals and alloys; Mn-Cu-Al, Mn-Cu-Sn and like Heusler's alloys; and $CrO_2$ and like metallic oxides.

The carrier core is usually about 30 to about 1000 $\mu$m, preferably about 50 to about 500 $\mu$m in diameter.

The coating on the carrier core is controlled such that it amounts to usually about 0.1 to about 3%, preferably about 0.5 to about 2% based on the weight of the core. After the formation of coating on the core, the carrier may be heated to improve the properties of the coating.

The carrier according to the invention is used in combination with a conventional toner in developing electrostatic images. The toner is produced by dispersing a coloring agent in a binder resin. Examples of the binder resin are polystyrene, p-chlorostyrene, α-methylstyrene and like polystyrenes; poly(methylacrylate), poly(ethylacrylate), poly(n-propylacrylate), poly(butylacrylate), poly(laurylacrylate), poly(2-ethylhexylacrylate), poly(methylmethacrylate), poly(ethylmethacrylate), poly(n-butylmethacrylate), poly(laurylmethacrylate), poly(2-ethylhexylmethacrylate) and like polymers of α-methylene monocarboxylic acid esters; polyacrylonitrile, polymethacrylonitrile and like polyvinylnitrile; poly(2-vinylpyridine), poly(4-vinylpyridine) and like polyvinylpyridines; poly(vinylmethylether), poly(vinylisobutylether) and like polyvinylethers; polyvinylmethylketone, polyvinylethylketone, polymethylisopropenylketone and like polyvinylketones; polyethylene, polypropylene, polyisopropylene, polybutadiene and like polymers of unsaturated hydrocarbons, and halogenated derivatives thereof; homopolymers and copolymers of halogenated unsaturated hydrocarbons; mixtures of at least two polymers indicated above, etc. The binder resin may contain rosin-modified phenol-formaldehyde resin, oil-modified epoxy resin, polyester, polyurethane, polyimide, cellulosic resin, polyester and like resins.

Examples of the coloring agents used in the toner are carbon black, nigrosine, aniline blue, chrome yellow, ultramarine blue, methylene blue, phthalocyanine blue, etc.

The toner may contain a known additive or additives such as wax, silica, zinc stearate, etc.

The carrier of the invention and the toner is uniformly mixed in an ratio of about 0.3 to about 20 parts by weight of the latter per 100 parts by weight of the former. The mixture is used for developing electrostatic images in magnetic brushing process, cascade process, etc.

The coating formed from the copolymer of the invention on the carrier core has high strength and good adhesion to the core. Thus, the carrier is excellent in durability and has a high electrostatic charge capacity.

The carrier having a coating formed from the copolymer of the invention is highly compatible with the toner produced especially for use with the silicone-coated carrier without impairing the excellent properties such as electrostatic charge stability, etc. of the carrier coated with fluorine- containing copolymer.

Since the copolymer according to the invention is highly soluble in organic solvents and has good adhesion to a substrate and high film strength, it is useful for materials for producing weathering-resistant coating compositions, cladding for optical fibers, durable films, etc.

EXAMPLES

Given below are examples and comparison examples to clarify the features of the present invention.

EXAMPLE 1

A 1-liter autoclave was charged with 230 cc of water and 386 g of 1,2-dichloro-1,1,2,2-tetrafluoroethane. The autoclave was subjected to nitrogen replacement and was further charged with 25 g of vinylidene fluoride (VdF), 6 g of tetrafluoroethylene (TFE) and 1.5 g of vinyl pivalate (VPv). The contents in the autoclave were heated to 40° C. and sufficiently stirred and 1 g of diisopropylperoxydicarbonate was added thereto to initiate a polymerization. Throughout the polymerization, a mixture of VdF, TFE and VPv was fed to the reaction system so that the polymerization was conducted in a ratio of 72:18:10 (mole %) for 12 hours. The copolymer thus obtained was collected and dried under reduced pressure at 100° C., giving 40 g of a copolymer. The elementary analysis of the copolymer gave a result of C:F:H=37.7:55.9:2.87 (% by weight). In the $^{19}$F-NMR spectrum of the copolymer using trifluoroacetic acid as the external reference and the numbers on the shift scale upfield from the reference being designated positive, there appeared the resonance of $CF_2$ of VdF between +15 and 17 ppm, the resonance of $CF_2$ between +42 and +46 ppm and between +47 to +49 ppm, and the resonance of $CF_2$ of bond (main chain) of VdF and TFE between +33 to +39 ppm. In the $^1$H-NMR spectrum of the copolymer using tetramethylsilane as the inner reference and the numbers on the shift scale upfield from the reference being designated positive, there appeared the resonance of $CH_3$ of VPv at 1.2 ppm, the resonance of CH of VPv between +5 to +6 ppm, and the resonance of $CH_2$ of VdF and VPv near at +3 ppm. A calculation based on the results of elementary analysis and the comparison of the peak strengths obtained in NMR spectra indicated the mole ratio of the components in the copolymer was VdF/TFE/VPv=73/19/8.

The copolymer was found to have a melting temperature (Tm) of 120° C., a crystalization temperature of 99° C. and an intrinsic viscosity ($\eta$) of 0.45 (at 35° C. using MEK).

EXAMPLE 2

Using 13 g of TFE, 21 g of VdF and 1.5 g of VPv and maintaining the mole ratio of additional monomers at VdF/TFE/VPv=60/30/10 during the reaction, the procedure of Example 1 was followed for 5.5 hours to obtain 45 g of a copolymer.

The copolymer was found to be composed of VdF/TFE/VPv=64/28/8 (molar ratio) from the calculation based on the elementary analysis and NMR spectra and have an intrinsic viscosity ($\eta$) of 0.57 (at 35° C. using MEK).

EXAMPLE 3

Using 16 g of TFE, 20 g of VdF and 1.5 g of VPv and maintaining the mole ratio of additional monomers at VdF/TFE/VPv=53/32/15 during the reaction, the procedure of Example 1 was followed for 9 hours to obtain 52 g of a copolymer.

The copolymer was found to be composed of VdF/TFE/VPv=57/30/13 (molar ratio) from the calculation based on the elementary analysis and NMR spectra and have an intrinsic viscosity ($\eta$) of 0.52 (at 35° C. using MEK).

EXAMPLE 4

Using 6 g of trifluoroethylene (TrFE), 26 g of VdF and 1 g of VPv and maintaining the mole ratio of additional monomers at VdF/TFE/VPv=72/18/10 during the reaction, the reaction procedure of Example 1 was followed for 16 hours to obtain 33 g of a copolymer.

The copolymer was found to be composed of VdF/TFE/VPv=72/18/10 (molar ratio) from the calculation based on the elementary analysis and NMR spectra and have an intrinsic viscosity ($\eta$) of 0.38 (at 35° C. using MEK).

EXAMPLE 5

A 3 parts by weight quantity of the copolymer obtained in Example 1 was dissolved in a mixture of 68 parts by weight of acetone and 29 parts by weight of MEK to prepare a coating solution.

A 200 g quantity of spherical iron particles (trademark "DSPR141", product of Dowa Iron Powder Co., Ltd., Japan: 100 $\mu$m in average particle size) serving as the carrier core material was coated with the coating solution using a fluidized bed apparatus at a temperature of 70° C. to form a carrier having a coating on the core in an amount of 0.5% by weight of the core.

A 3 parts by weight of a toner (commercially available and intended for use in a copying machine "FT 4800", product of Ricoh Co., Ltd. was added to 97 parts by weight of the carrier as obtained above.

A 7 g quantity of the combined toner and carrier was stirred in a glass container (50 ml) for 30 minutes at 300 rpm to prepare a uniform mixture as an electrostatic image developer.

A 200 mg quantity of the mixture was taken to evaluate the electrostatic charge of the toner by the blow-off method. The value was +2.8 $\mu$C/g.

EXAMPLE 6

The copolymer obtained in Example 2 was processed in the same manner as in Example 5 to prepare a mixture of carrier and toner.

The electrostatic charge on the toner was 3.4 $\mu$C/g.

EXAMPLE 7

The polymer produced in Example 3 was processed in the same manner as in Example 5 to prepare a mixture of carrier and toner.

The electrostatic charge on the toner was +3.30 $\mu$C/g.

EXAMPLE 8

The copolymer obtained in Example 4 was processed in the same manner as in Example 5 to form a mixture of carrier and toner.

The electrostatic charge on the toner was +3.65 $\mu$C/g.

COMPARISON EXAMPLE 1

A VdF/TFE copolymer (trademark "Neoflon VdFVT100", product of Daikin Industries, Ltd.) was processed in the same manner as in Example 5 to prepare a carrier and further combined with the toner to prepare a mixture of carrier and toner.

The electrostatic charge on the toner was 16.01 μC/g.

COMPARISON EXAMPLE 2

A copolymer prepared from 70 parts of VdF, 20 parts of TFE and 10 parts of vinyl butyrate was processed in the same manner as in Example 5 to prepare a carrier and further combined with the toner to prepare a mixture.

The electrostatic charge on the toner was 1.73 μC/g.

TEST EXAMPLE 1

A cluster of toner particles 9 μm in mean particle size was prepared by mixing together with use of a ball mill 100 parts by weight of a styrene/methyl methacrylate/n-butyl methacrylate copolymer (=50/20/30), 10 parts by weight of carbon black (trademark "Regal 660R", product of Cabot Co., Ltd.), 3.5 parts by weight of a low-molecular-weight polypropylene (trademark "Viscol 660P", product of Sanyo Chemical Industry, Ltd.) and 2 parts by weight of nigrosine dye (trademark "Oil Black SO", Orient Chemical Co, Ltd.), kneading and grinding the mixture and classifying the particles.

Two parts by weight of the toner was mixed with 100 parts by weight of each carrier obtained in Examples 5 to 8 and Comparison Examples 1 and 2, giving developers for electronic photographic copying machines.

Using the developers thus prepared, a copying operation was continuously carried out to produce photocopies on the modified version of electrophotographic copying machine "U-Bix 3000" (trademark, product of Konishiroku Photo Industry Co., Ltd.) incorporating a negative electrostatic dual-layer organic photoconductive photosensitive member containing an anthoanthrone-type pigment as a charge-generation material and a carbazole derivative as a charge-transported material. Up to 50,000 photocopies can be continuously produced on which images with no fogging were formed using the developer containing the carriers of Examples 5 to 8. When the photographic density of the original was 1.3 the highest density of the copied image after 50,000 photocopies was more than 1.3.

When the developer incorporating the carrier of Comparison Example 1 was used, the highest density at the start of the copying operation was only 0.6.

The copying operation using the developer with the carrier of Comparison Example 2 initiated fogging on production of only 15 copies.

We claim:

1. A carrier for developing electrostatic image, the carrier comprising a core and coating on the core, the coating being formed from a copolymer comprising:
   (a) 50 to 85 mole % of a structural unit represented by the formula

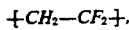

(b) 5 to 40 mole % of a structural unit represented by the formula

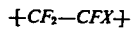

wherein X is H or F, and
   (c) 3 to 18 mole % of a structural unit represented by the formula

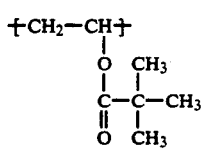

2. A carrier for developing electrostatic image according to claim 1 wherein the copolymer has an intrinsic viscosity (η) of about 0.2 to about 2.0 as determined at 35° C. using methyl ethyl ketone as a solvent.

3. A carrier for developing electrostatic image according to claim 2 wherein the copolymer has an intrinsic viscosity (η) of about 0.35 to about 1.0.

4. A carrier for developing electrostatic image according to claim 1 wherein the weight of the coating is about 0.1 to about 3% of the weight of the core.

5. A carrier for developing electrostatic image according to claim 4 wherein the weight of the coating is about 0.5 to about 2% of the weight of the core.

6. A carrier for developing electrostatic image according to claim 1 wherein the coating being formed from a copolymer comprising:
   (a) 55 to 80 mole % of the structural unit represented by the formula

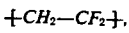

(b) 15 to 35 mole % of the structural unit represented by the formula

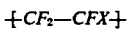

wherein X is as defined above, and
   (c) 5 to 15 mole % of the structural unit represented by the formula

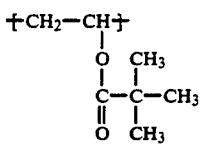

7. A carrier for developing electrostatic image according to claim 6, wherein the copolymer further contains in an amount of up to 30% by weight of the copolymer at least one monomer selected from the group consisting of $CF_2=CFCl$, $CF_2=CFCF_3$, $CF_2=CFOC_3F_7$, $CH_2=CFH$, $CH_2=CFCl$ and $CH_2=CHOCH_2CF_3$.

* * * * *